US009222532B2

(12) United States Patent
Thomas et al.

(10) Patent No.: US 9,222,532 B2
(45) Date of Patent: Dec. 29, 2015

(54) BRAKE CARRIER

(75) Inventors: Paul Thomas, Newport (GB); Jonathan Leslie Christopher Jackson, Herefordshire (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 2541 days.

(21) Appl. No.: 11/856,980

(22) Filed: Sep. 18, 2007

(65) Prior Publication Data

US 2008/0067015 A1    Mar. 20, 2008

(30) Foreign Application Priority Data

Sep. 19, 2006  (GB) .................................. 0618416.2

(51) Int. Cl.
*F16D 65/00* (2006.01)
*F16D 55/00* (2006.01)

(52) U.S. Cl.
CPC ............ *F16D 55/00* (2013.01); *F16D 65/0056* (2013.01); *F16D 2055/0008* (2013.01)

(58) Field of Classification Search
CPC ............ F16D 55/00; F16D 2055/0008; F16D 65/0056; F16D 2200/00
USPC ...... 188/18 R, 18 A, 73.31, 73.32, 73.1, 71.1, 188/205 R, 206 R, 218 R
See application file for complete search history.

(56) References Cited

U.S. PATENT DOCUMENTS

| | | | | |
|---|---|---|---|---|
| 3,093,890 A | * | 6/1963 | Sparks | 29/888.04 |
| 3,371,756 A | * | 3/1968 | Spitz | 188/251 M |
| 3,630,487 A | * | 12/1971 | Wechter, Jr. | 254/88 |
| 3,730,306 A | * | 5/1973 | Rath | 188/345 |
| 4,093,044 A | * | 6/1978 | Unterberg | 188/73.45 |
| 4,256,445 A | * | 3/1981 | Pingree | 425/101 |
| 5,538,105 A | * | 7/1996 | Rike | 188/73.32 |
| 6,250,439 B1 | * | 6/2001 | Matsuzaki | 188/73.31 |
| 6,302,243 B1 | * | 10/2001 | Ruiz | 188/73.1 |
| 6,408,991 B1 | * | 6/2002 | Herffurth et al. | 188/71.1 |
| 6,935,468 B2 | * | 8/2005 | Regazzoni et al. | 188/71.1 |
| 2003/0042697 A1 | | 3/2003 | McCann | |
| 2004/0016610 A1 | * | 1/2004 | Morris | 188/73.31 |

(Continued)

FOREIGN PATENT DOCUMENTS

| | | |
|---|---|---|
| DE | 3245157 | 6/1984 |
| DE | 4036272 | 5/1992 |
| DE | 19857074 | 6/2000 |

(Continued)

OTHER PUBLICATIONS

United Kingdom Search Report dated Jan. 11, 2007.

(Continued)

*Primary Examiner* — Melody Burch

(74) *Attorney, Agent, or Firm* — Brooks Kushman P.C.

(57) ABSTRACT

A brake carrier for a heavy vehicle disc brake includes an actuating side carrier portion including a support for an actuating side brake pad having a first material having a first property. The brake carrier also includes a separate reaction side carrier portion having a support for a reaction side brake pad for securement to the actuating side carrier portion. The actuating side carrier portion includes a first material having a first property, and the reaction side carrier portion includes a second material having a second property, wherein the second property differs from the first property.

26 Claims, 6 Drawing Sheets

(56) References Cited

U.S. PATENT DOCUMENTS

| | | | |
|---|---|---|---|
| 2004/0058737 A1* | 3/2004 | Yoshida et al. | 464/145 |
| 2011/0042172 A1* | 2/2011 | Drewes | 188/234 |

FOREIGN PATENT DOCUMENTS

| | | |
|---|---|---|
| EP | 0959260 | 11/1999 |
| EP | 959260 A | 11/1999 |
| EP | 959260 A2 | 11/1999 |
| EP | 1293405 | 3/2003 |
| FR | 2321351 A * | 4/1977 |
| GB | 2027826 | 2/1980 |
| GB | 2131507 | 6/1984 |
| GB | 2417302 | 2/2006 |
| WO | WO-2006007886 A1 * | 1/2006 |

OTHER PUBLICATIONS

Extended European Search Report dated Mar. 4, 2009.
English language response to opposition dated Jul. 31, 2012.

* cited by examiner

BRAKE CARRIER

REFERENCE TO RELATED APPLICATIONS

This application claims priority to United Kingdom Patent Application No. GB 0618416.2 filed on Sep. 19, 2006.

BACKGROUND OF THE INVENTION

The present invention relates to a brake carrier, in particular, a carrier for a heavy vehicle disc brake.

Heavy vehicles, such as rigid body trucks, tractor and semi-trailer trucks, and buses may be braked on their steered and unsteered axles, driven and undriven axles by either drum brakes or disc brakes. Drum brake linings and their associated actuation mechanisms are supported on fixed axles or the steering knuckles of steered axles by a bracket welded directly to the axle, which has all the required mounting parts, or via an intermediate bracket welded to the axle with a number of mounting holes for the bolts of a separate support for the linings and actuation mechanism.

In the latter case, it is known to provide an adapter plate that is bolted to this intermediate bracket in order that a brake carrier of a sliding caliper disc brake may be mounted to an axle otherwise intended to mount drum brakes. This is particularly useful when a vehicle originally fitted with drum brakes is to be updated to have disc brakes as it enables the original axles to be retained without complex modifications.

Disadvantageously, this arrangement adds to the overall weight of the axle and brake without a corresponding increase in strength, and results in additional fixing bolts being used in locations where they are not readily accessible when the axle is installed on a vehicle.

Furthermore, it has become apparent in recent years that as clamp forces, and hence frictional forces, in heavy vehicle brakes rise, it is increasingly difficult to produce a brake carrier that is sufficiently strong, light and compact to transmit this load to the vehicle axle, particularly on the actuating side thereof.

The present invention seeks to overcome, or at least mitigate the problems of the prior art.

SUMMARY OF THE INVENTION

Accordingly, one aspect of the present invention provides a brake carrier for a heavy vehicle disc brake, the brake carrier including an actuating side carrier portion including a support for an actuating side brake pad and a separate reaction side carrier portion including a support for a reaction side brake pad for securement to the actuating side carrier portion. The actuating side carrier portion includes a first material having a first property, and the reaction side carrier portion includes a second material having a second property, wherein the second property differs from the first property.

A second aspect of the present invention provides a brake carrier for a heavy vehicle disc brake including an actuating side carrier portion including a mounting formation for mounting the actuating side carrier portion to a drum brake bracket and a support for an actuating side brake pad. The brake carrier includes a separate reaction side carrier portion securable to the actuating side carrier portion including a support for a reaction side brake pad.

A third aspect of the present invention provides a method of making a carrier having an actuating side portion and a separate reaction side portion. The method includes the steps of: 1) manufacturing the actuating side portion to comprise a first material having a first property, 2) manufacturing the reaction side portion to comprise a second material having a second property distinct from the first property, and 3) assembling the actuating side portion and the reaction side portion together to form a complete carrier.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

Figure 1:
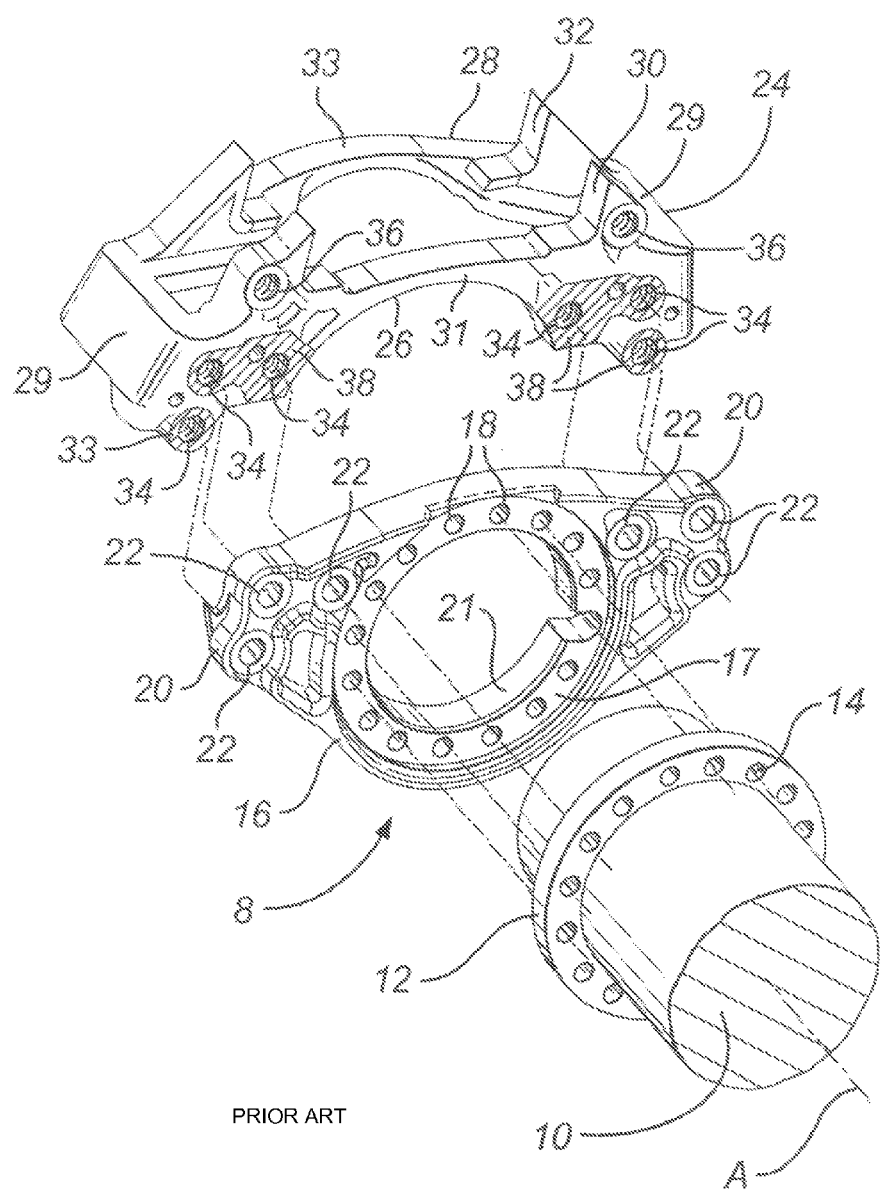
FIG. 1 is an exploded perspective view of a prior art disc brake carrier and adapter assembly.

With reference to FIG. 1, a typical prior art assembly 8 for mounting a carrier 24 of a sliding caliper disc brake (caliper not shown) to an axle 10 having an intermediate bracket 12 intended originally for mounting a drum brake (not shown) to the axle 10.

The axle 10 in this embodiment has a circular cross-section, which defines an axis A, and is shown with the wheel-end portion for the mounting of a wheel bearing and hub omitted for clarity. In other embodiments, the axle 10 may have a square or other suitable cross-section.

An intermediate bracket 12 is welded to the axle 10 in the form of a ring extending around a radially outer surface thereof and is provided with a plurality (in this case 15) bores 14 therethrough in a direction parallel to the axis A.

An adapter plate 16 has a circular aperture 21 therein dimensioned to fit over the axle 10, and a ring portion 17 surrounds the circular aperture 21. The ring portion 17 includes a plurality of bores 18 (also 15 in this embodiment) that are aligned with the corresponding bores 14 in the intermediate bracket 12. The intermediate bracket 12 and the adapter plate 16 are secured together by bolts (usually 6; not shown) inserted through the bores 14 and 18.

The adapter plate 16 further includes first and second wing portions 20 extending in generally opposing directions transverse the axis A. A group of three through-bores 22 is arranged on each wing portion 20 in a triangular configuration, also in a direction parallel to the axis A. An area of the face of the adapter plate 16, not visible in FIG. 1, is machined flat in a plane transverse the axis A.

A known, the one-piece "closed frame" carrier 24 is secured to the adapter plate 16 by the insertion of bolts (not shown) through the through bores 22 and into corresponding threaded bores 34 provided in one face of the carrier 24. Areas 38 of the carrier 24 surrounding the threaded bores 34

(hatched in FIG. 1) are machined flat so that good, accurate contact between the carrier 24 and the adapter plate 16 is achieved.

The carrier 24 includes an actuating side portion 26 (or inboard portion) having a supporting recess 30 for an actuating side brake pad (not shown), a relatively thin actuating side bridge portion 31 defining the radially innermost portion of the supporting recess 30, and threaded bores 36 on either side of the supporting recess 30 for guide pins (not shown) to slidably mount a brake caliper thereon (not shown).

The carrier 24 further includes a reaction side portion 28 (or outboard portion) cast integrally with the actuating side portion 26 and spaced therefrom by arms 29 positioned to extend over the brake disc or rotor (not shown) in use. The reaction side portion 28 includes a supporting recess 32 for the reaction side brake pad (not shown), with a relatively thin reaction side bridge portion 33 defining the radially innermost portion of the supporting recess 32.

When the brake is fully assembled and is applied to slow rotation of the wheel with which it is associated, the actuating side brake pad is directly urged towards the rotor by an actuating mechanism (not shown) housed in the caliper, and the reaction side brake pad is indirectly urged towards the rotor by virtue of a reaction load through the sliding caliper as the actuating side brake pad contacts the rotor. This clamps the rotor between the brake pads and generates circumferential friction or drag torque load that slows the rotor and the wheel. This circumferential load is transmitted from the brake pads to the actuating and reaction side portions of the carrier 24, and then to the axle 10 via the adapter plate 16 and the intermediate bracket 12.

Prior art carriers 24 are manufactured in a casting process of iron or steel and therefore have substantially homogeneous material properties. As noted above, various areas, such as mating faces 35, are machined to obtain a smooth surface, as casting inevitably results in a relatively rough surface. The weakest area of the carrier 24 under braking drag loads has been found to be the actuating side bridge portion 31, as limited space is available at this location, and the thickness of the actuating side bridge portion 31 is typically minimized. Thus, in order to increase an amount of frictional load that can be applied by the brake, it is desirable to increase the strength of the actuating side bridge portion 31, without increasing its dimensions.

Figure 2:
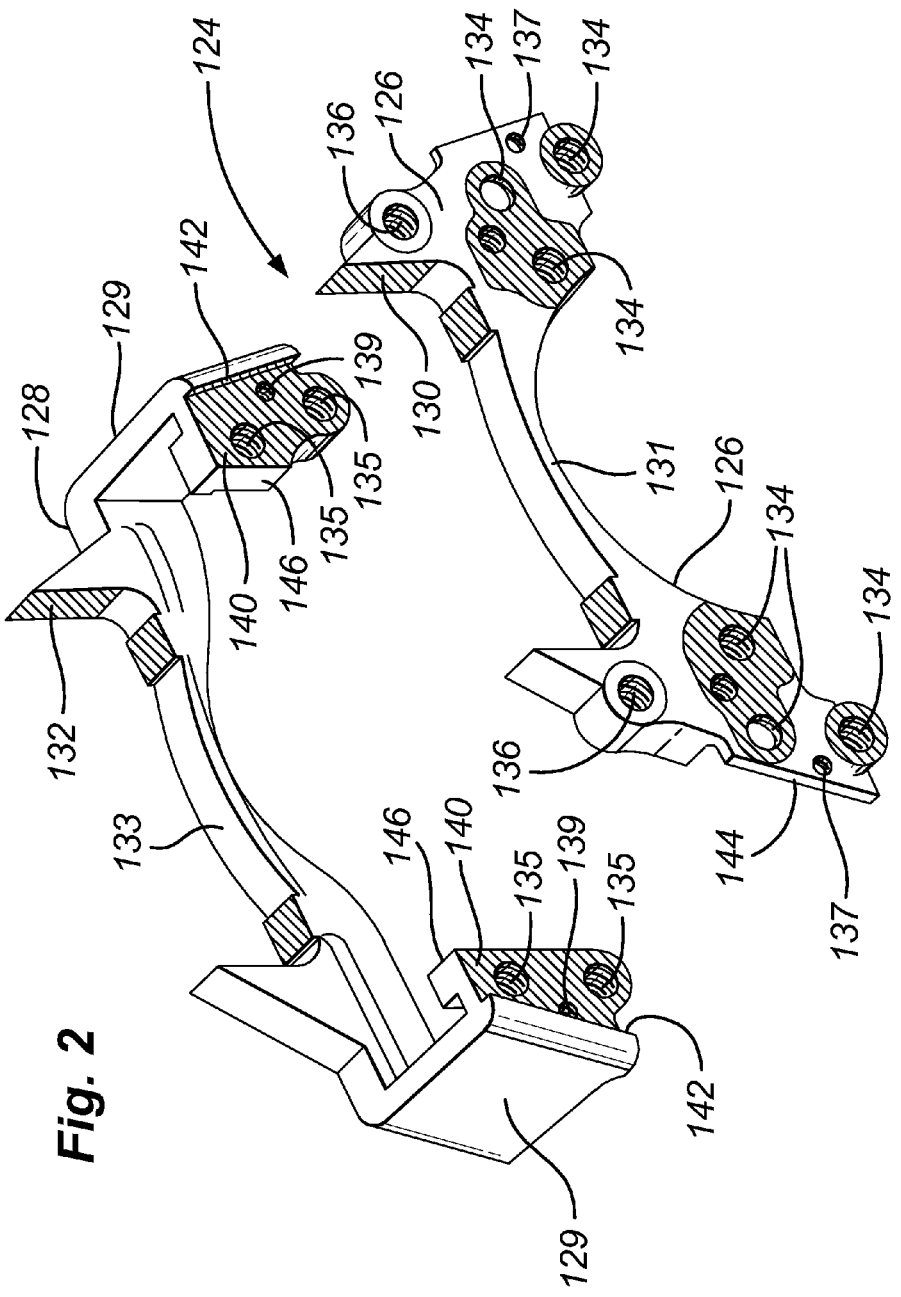
FIG. 2 is an exploded perspective view of a brake carrier and adapter assembly according to one embodiment of the present invention.
Figure 3:
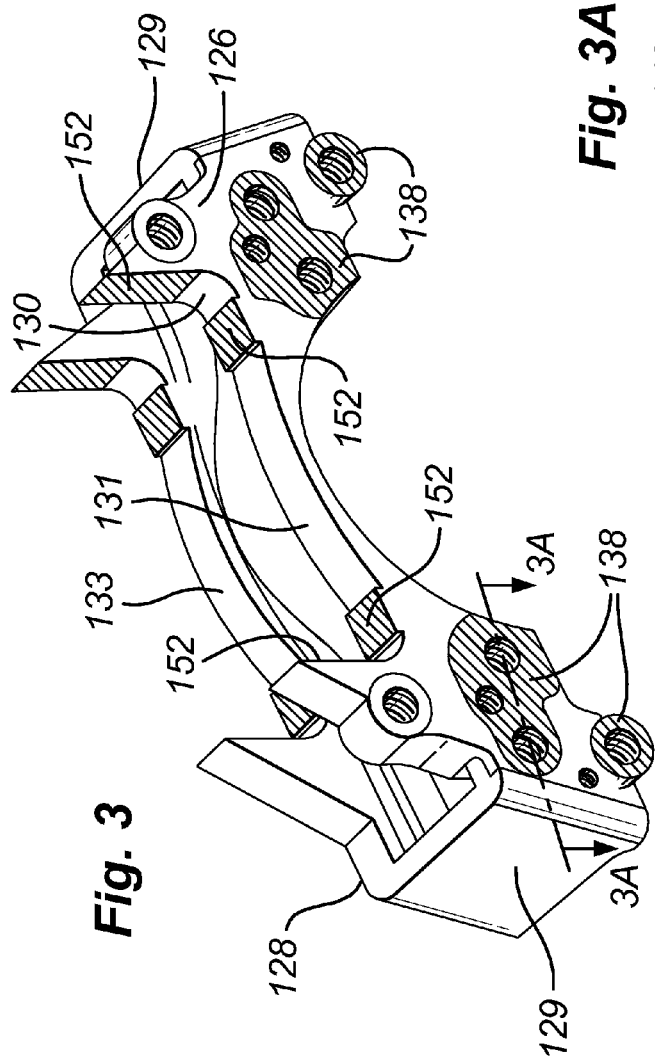
FIG. 3 is a perspective view of the carrier of FIG. 2 in an assembled state.

Referring to FIGS. 2 and 3, a carrier 124 according to a first embodiment of the present invention is shown. Like parts has been labelled by like numerals with the addition of the prefix "1". Only those differences with respect to the prior art are discussed in great depth.

The carrier 124 includes an actuating side portion 126 and a separate reaction side portion 128. The actuating side portion 126 includes a recess 130 for accommodating an actuating side brake pad and threaded bores 136 for caliper guide pins (not shown). The reaction side portion 128 includes a recess 132 for a reaction side brake pad (not shown) and arms 129.

Figure 3A:
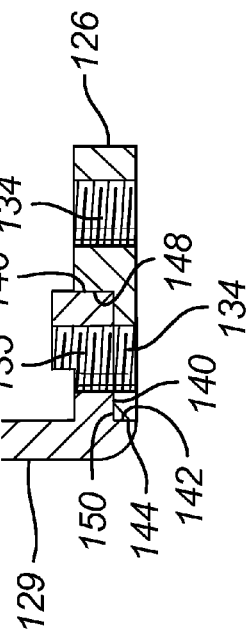
FIG. 3A is a cross-section through the carrier of FIG. 3 on line 3A-3A.

With reference to FIG. 3A, the reaction side portion 128 includes a transverse mating face 140 arranged to contact a corresponding face 150 of the actuating side portion 126. The reaction side portion 128 further includes circumferential faces 142 and 146 that contact corresponding faces 144 and 148 of the actuating side portion 126. As a result, when the actuating side portion 126 and the reaction side portion 128 are brought together as shown in FIG. 3, the actuating side portion 126 and the reaction side portion 128 are keyed together in a circumferential direction in order that the drag loads from the reaction side pad are effectively transmitted to the actuating side portion 126.

When brought together, four bores 134 of the actuating side portion 126 align with four threaded bores 135 of the reaction side portion 128, as do two smaller bores 137 and 139 of the reaction side portion 128 and the actuation side portion 126, respectively. The side portions 126 and 128 are secured together by bolts (not shown) inserted into the bores 134, 135, 137 and 139.

The actuating side portion 126 has a less complex shape than the reaction side portion 128. Thus, the actuating side portion 126 is manufactured relatively cost-effectively using a forging process, e.g., forged steel. Advantageously, forging results in a stronger and more durable (tougher) actuating side portion 126, thereby providing a bridge portion 131 that can withstand increased loads. Beneficially, forging inherently results in a finished product with a smoother surface than casting. Thus, the surfaces 138, 144, 148, 150 and the actuation side abutment surfaces 152 of the recess 130 may not require machining, or the amount of machining may be reduced. Additionally, it is common for abutment surfaces of cast carriers to require induction hardening in order to withstand the rigours of supporting the brake pads in use. As forging results in a tougher end product, induction hardening of the actuating side abutment surfaces 152 may not be required. As a result, the use of a two portion carrier may surprisingly not result in significantly increased manufacturing costs, or may even result in reduced costs compared to a integral carrier, contrary to what might normally be expected.

Figure 4:
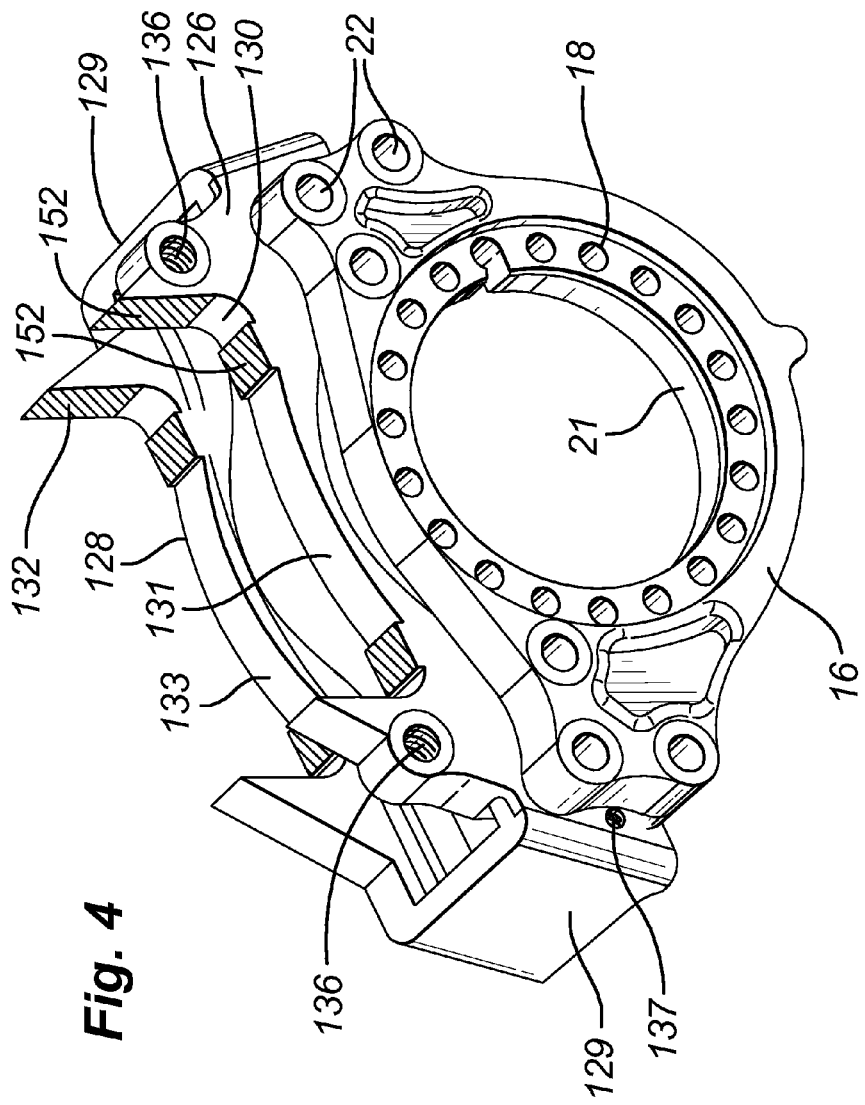
FIG. 4 is a perspective view of the carrier of FIG. 2 when assembled to an adapter plate.

With reference to FIG. 4, the part count and assembly cost of the carrier 124 of the first embodiment of the present invention may be minimized by using the same bolts to secure the actuating side portion 126 and the reaction side portion 128 of the carrier 124 together, as are also used to secure the carrier 124 to the adapter plate 16 or to a steering knuckle (not shown) of an axle via the bores 22, 134 and 135.

Figure 5:
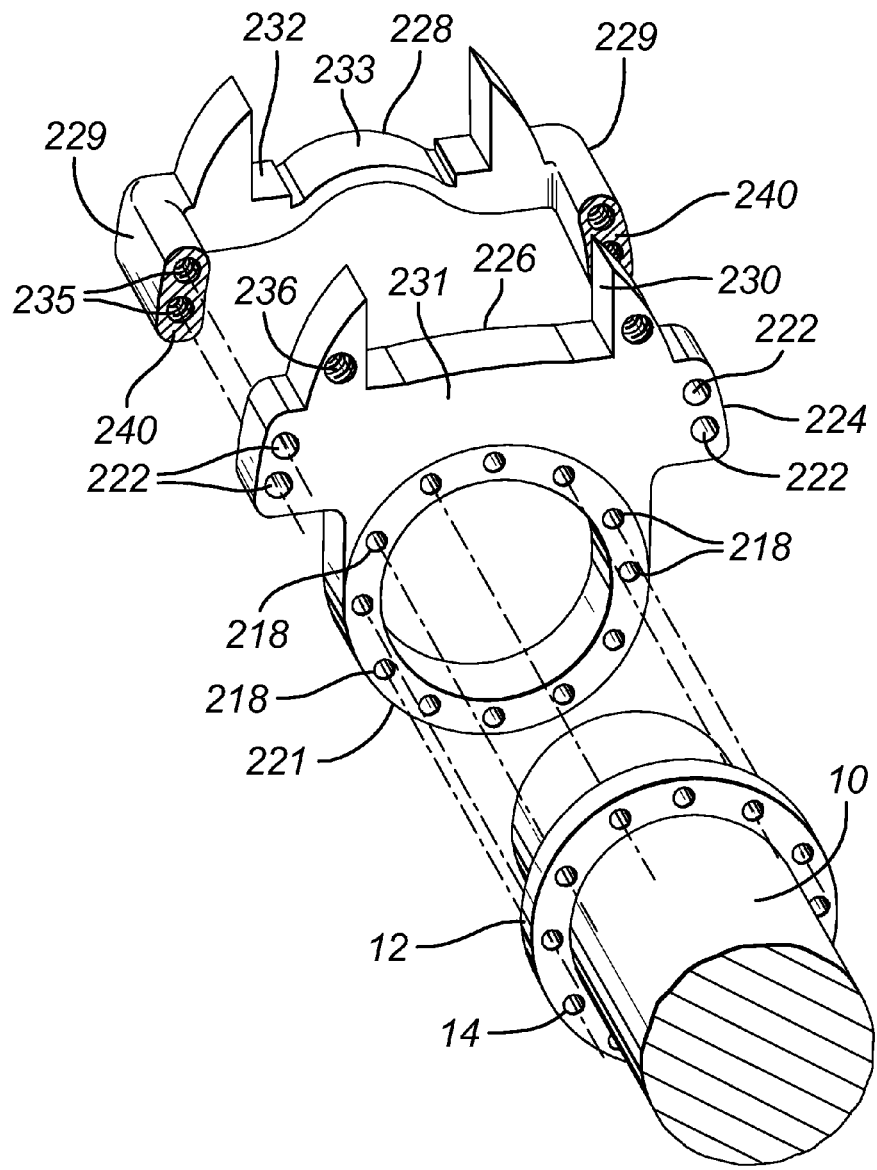
FIG. 5 is an exploded perspective view of a carrier according to a second embodiment of the present invention and a vehicle axle.

Turning now to FIG. 5, a second embodiment of the present invention is illustrated, with similar parts denoted by the same reference numerals, with the addition of the prefix "2". Again, only differences with respect to the prior art and first embodiment are discussed in great depth. The actuating side carrier portion includes an integral mounting formation 218 for mounting the actuating side carrier portion to one of an axle, a steering knuckle or a suspension component, the integral mounting formation 218 being a mounting for a drum brake bracket.

A carrier 224 of the second embodiment includes a reaction side portion 228 similar to that of the first embodiment, except that it omits the circumferential mating faces and includes a single transverse face 240.

An actuating side portion 226 of the carrier 224 is however integrally formed with the adapter plate, such that the actuating side portion 226 of the carrier 224 is secured directly to the intermediate bracket 12 by bolts (not shown) through the bores 14 of the intermediate bracket 12 and bores 218 of the carrier 224. The bolts transmit the circumferential load from the reaction side brake pad to the actuating side portion 226 of the carrier 224 due to the omission of circumferential mating faces.

In this embodiment, the actuating side portion 226 of the carrier 224 is formed by forging from steel, whereas the reaction side portion 228 is cast from iron. Forging of the actuating side portion 226 remains feasible due to its relatively simple shape, despite the addition of the ring portion 221.

The second embodiment further simplifies the construction of the carrier 224 by eliminating a component and removing a number of contact faces. Furthermore, it saves weight by eliminating a duplication of material, specifically around the bridge 231 of the actuating side portion 226.

Figure 6:
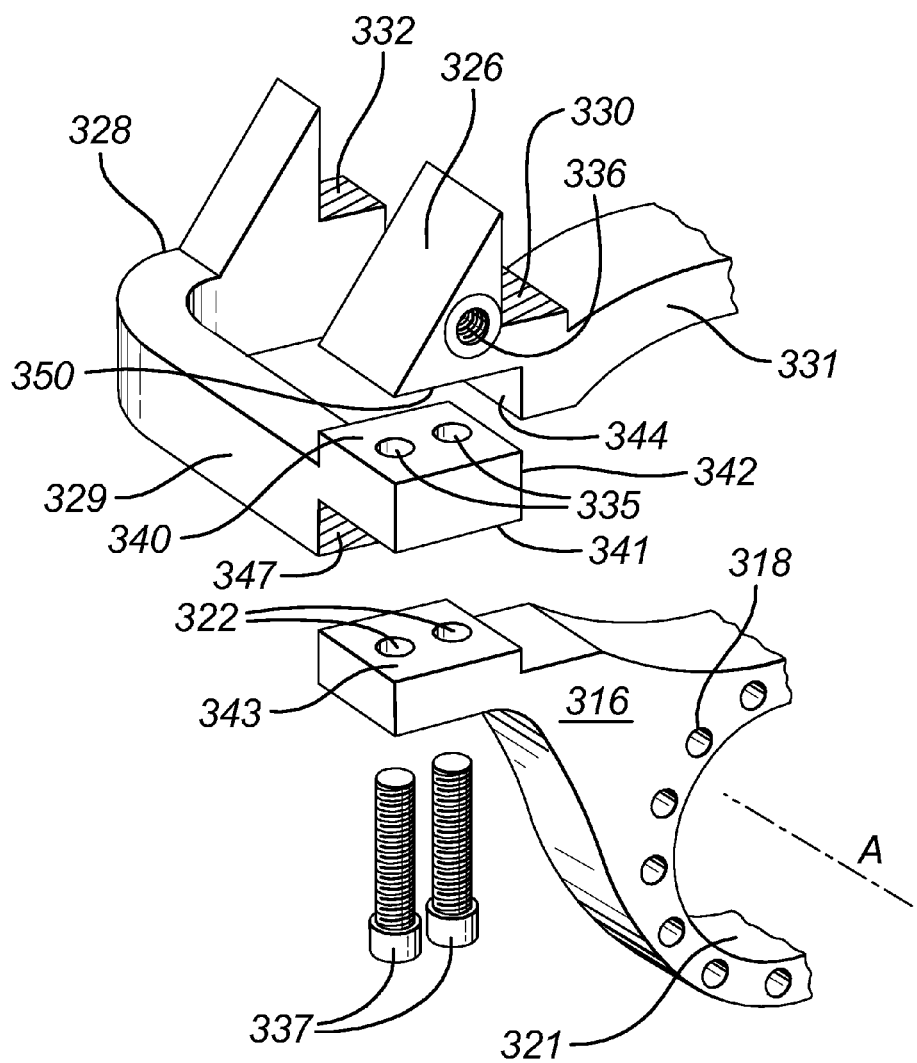
FIG. 6 is an exploded perspective view of a portion of a carrier according to a third embodiment of the present invention.

FIG. 6 illustrates a third embodiment of the present invention, which is a further variant of the first embodiment and in which like numerals reference similar parts, but with the addition of the prefix "3", and only differences with respect to the first embodiment are discussed in great depth.

In the third embodiment, a similar principle of constructing the carrier is used as in the first embodiment, except that the bolting together of the actuating side portion 326 and the reaction side portion 328, together with the adapter plate 316, is achieved in the radial direction rather than the axial direction. Specifically, the adapter plate 316 is provided with a first and second coplanar adapter plate surfaces 343 (only one shown in FIG. 6) having a pair of tangential radial bores 322 provided therein, and the radial bores 322 extend substantially perpendicular to a longitudinal axis A of the axle 10. As such, the plane on which the surfaces lie is a chord of an imaginary circle whose center is the axis A.

The reaction side portion 328 is provided with first and second complimentary carrier mating surfaces 341 (again, only one shown in FIG. 6) and aligned bores 335. In addition, opposing the carrier mating surfaces 341 and parallel thereto are third and fourth carrier surfaces 340 configured to contact the first and second surfaces 350 of the actuating side portion 326 of the carrier 324. Further, threaded bores (not visible) extend into the actuating side portion 326 such that all three components may be held together. Thus, the arms 329 of the reaction side portion 328 are sandwiched between the adapter plate surfaces 343 and the actuating side portion 326 and are securely bolted together by bolts 337.

To enhance the rigidity of the connections, the reaction side portion 338 is provided with a further abutment surface 347 extending transverse to the axis of the axle 10 and is arranged to contact a corresponding surface of the adapter plate 316 (not visible). In addition, the actuating side portion 326 is provided with a surface 344 extending parallel to the axis A of the axle 10 and which is arranged to contact a corresponding surface 342 of the reaction side portion 328. By bolting the components together tangentially (i.e., substantially transverse to axis A), access to the heads of the bolts 337 may be improved during installation and disassembly for maintenance.

In alternative embodiments, the order of the adapter plate 316, the reaction side portion 328 and the actuating side portion 326 may be altered, so that, for example, the actuating side portion 326 may be sandwiched between the adapter plate 316 and the reaction side portion 328, or the adapter plate 316 may be sandwiched between the other two portions. Furthermore, the second embodiment of the present invention illustrated in FIG. 5 may be adapted to provide for tangential bolting, rather than axial bolting, in which the reaction side portion 228 may be secured to the integral actuating side portion via tangential bolts and tangential mating surfaces. In addition, the arrangement may be altered such that the bolts are secured in a radially inward rather than radially outward direction, and the corresponding pairs of surfaces may be angled with respect to each other, rather than being coplanar.

In other embodiments of the present invention, certain advantages of the carrier shown in FIG. 5 can be retained without the use of differing materials for the actuating side portion and the reaction side portions. For example, both portions may be cast, or both may be forged and the advantages of reduced material, part count, weight, and of ease of assembly are retained. Indeed, manufacturing a carrier from two portions makes it technically feasible to forge both portions such that both portions may require no or minimal machining, and no or minimal induction hardening or the like.

In addition, a two-portion carrier enables the reaction portion to be unbolted and removed with the caliper remaining in-situ on the guide pins. The geometry of the brake can be such that a normal one-piece brake rotor can be removed without removing the caliper. This is advantageous from a servicing point of view as it reduces maintenance time and the problems associated with lifting a heavy caliper once it is removed.

Numerous changes may be made within the scope of the present invention. Other ways of altering the material properties of the actuating portion to enhance its strength and durability may be employed. For example, a reinforcing bar may be provided in the actuating bridge, and the remainder of the actuating portion cast around the bar. The carrier may be adapted for any suitable fixing arrangement to an axle or steering knuckle, including, in the case of the first embodiment, direct welding to the axle. Alternative forms of mating faces for the actuating and reaction side portions may be employed.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A brake carrier for a heavy vehicle disc brake, the brake carrier comprising:
   an actuating side carrier portion including a support for an actuating side brake pad, said actuating side carrier portion comprising a first material having a first property;
   a separate reaction side carrier portion securable to the actuating side carrier portion and including a support for a reaction side brake pad, wherein the separate reaction side carrier portion comprises a second material having a second property, wherein the second property differs from the first property; and
   wherein the first material is a forged material and the second material is a cast material.

2. The brake carrier according to claim 1, wherein the first material has a greater strength than the second material.

3. The brake carrier according to claim 1, wherein the first material has a greater toughness than the second material.

4. The brake carrier according to claim 1, wherein the first material has a smoother surface than the second material.

5. The brake carrier according to claim 1, wherein the actuating side carrier portion includes a recess including abutment surfaces for circumferential support of the actuating side brake pad.

6. The brake carrier according to claim 5, wherein the abutment surfaces are unmachined.

7. The brake carrier according to claim 5, wherein the abutment surfaces are not induction hardened.

8. The brake carrier according to claim 1, wherein the separate reaction side carrier portion further includes arms configured to extend over a brake rotor of a brake, in use.

9. The brake carrier according to claim 1, wherein the actuating side carrier portion and the separate reaction side carrier portion include complementary mating surfaces.

10. The brake carrier according to claim 9, wherein the complementary mating surface of the actuating side carrier portion are unmachined.

11. The brake carrier according to claim 9, wherein the complementary mating surfaces include complementary circumferential mating surfaces.

12. The brake carrier according to claim 1, wherein the actuating side carrier portion further includes an integral mounting formation for mounting the actuating side carrier portion to one of an axle, a steering knuckle or a suspension component.

13. The brake carrier according to claim 12, wherein the integral mounting formation is a mounting for a drum brake bracket.

14. A brake carrier for a heavy vehicle disc brake, the brake carrier comprising:
- an actuating side carrier portion including a mounting formation for bolting the actuating side carrier portion to a drum brake bracket, and a support for an actuating side brake pad;
- a separate reaction side carrier portion securable to the actuating side carrier portion including a support for a reaction side brake pad; and
- wherein the mounting formation comprises bores configured to receive bolts therethrough to secure the brake carrier to the drum brake bracket.

15. The brake carrier according to claim 14, wherein the mounting formation includes a plurality of bores.

16. The brake carrier according to claim 14, wherein the mounting formation is arranged to fully encircle an axle.

17. The brake carrier according to claim 14, wherein the actuating side carrier portion and the separate reaction side carrier portion comprise forged material.

18. A method of making a carrier having an actuating side portion including a support for an actuating side brake pad and a separate reaction side portion including a support for a reaction side brake pad, the method comprising the steps of:
1) forging the actuating side portion to comprise a first material having a first property;
2) casting the separate reaction side portion to comprise a second material having a second property distinct from the first property, and to be configured for securement to the actuating side portion; and
3) assembling the actuating side portion and the separate reaction side portion together to form a complete carrier.

19. The brake carrier according to claim 1, wherein the forged material is forged steel.

20. The brake carrier according to claim 1, wherein the cast material is cast iron.

21. The brake carrier according to claim 17, wherein the forged material is forged steel.

22. The brake carrier according to claim 1, wherein the actuating side carrier portion includes a caliper guide pin feature adapted to receive a caliper guide pin for connection to a caliper.

23. The brake carrier according to claim 14, wherein the actuating side carrier portion includes a caliper guide pin feature adapted to receive a caliper guide pin for connection to a caliper.

24. The method according to claim 18, including forming a caliper guide pin feature in the actuating side portion such that the caliper guide pin feature is adapted to receive a caliper guide pin for connection to a caliper.

25. The brake carrier according to claim 14, wherein the mounting formation comprises a drum brake bracket mounting formation that is configured to fit over an axle.

26. The brake carrier according to claim 14, wherein the mounting formation comprises a circular aperture and a ring portion surrounding the aperture, the ring portion including the bores.

* * * * *